(12) United States Patent
Masuyama

(10) Patent No.: US 8,934,126 B1
(45) Date of Patent: Jan. 13, 2015

(54) IMAGE PROCESSING CONTROLLER FOR PERFORMING IMAGE PROCESSING IN COOPERATION WITH IMAGE FORMING APPARATUS, IMAGE FORMING SYSTEM INCLUDING IMAGE PROCESSING CONTROLLER, METHOD OF CONTROLLING IMAGE FORMING SYSTEM, AND STORAGE MEDIUM

(71) Applicant: Canon Kabushiki Kaisha, Tokyo (JP)

(72) Inventor: Yuka Masuyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/298,039

(22) Filed: Jun. 6, 2014

(30) Foreign Application Priority Data

Jun. 24, 2013 (JP) ................................. 2013-131615

(51) Int. Cl.
*G06F 3/12* (2006.01)
(52) U.S. Cl.
CPC .............. *G06F 3/1221* (2013.01); *G06F 3/126* (2013.01); *G06F 3/1229* (2013.01)
USPC .......................... 358/1.15; 358/1.14; 358/1.16
(58) Field of Classification Search
USPC ............. 358/1.13, 1.14, 1.15, 1.16, 401, 448; 38/501; 399/10, 11, 18, 21, 24, 88
See application file for complete search history.

(56) References Cited

U.S. PATENT DOCUMENTS

2012/0246502 A1 9/2012 Koga
2012/0293838 A1* 11/2012 Yamagami et al. .......... 358/1.15

FOREIGN PATENT DOCUMENTS

JP 2012-203464 A 10/2012

* cited by examiner

*Primary Examiner* — Vu B Hang
(74) *Attorney, Agent, or Firm* — Rossi, Kimms & McDowell LLP

(57) ABSTRACT

An image processing controller capable of preventing an image forming apparatus from being caused to return from a power saving state inefficiently, and wastefully consuming electric power. The controller acquires the status of the apparatus. When the apparatus has received a job in the power saving state, the controller determines whether or not to cause the apparatus to return from the power saving state based on the acquired status of the apparatus. The controller stores the job when there is no need to cause the apparatus to return from the power saving state, and transmits raster image data generated based the stored job to the apparatus when it has returned from the power saving state. When there is need to cause the apparatus to return from the power saving state, the controller transmits raster image data generated based on the received job to the apparatus.

10 Claims, 12 Drawing Sheets

FIG. 12

Job A input at 16:55 December 21 has been printed.

WEEKLY SHUTDOWN SETTINGS

| MON | TUE | WED | THU |
|---|---|---|---|
| 18:00 | 18:00 | 18:00 | 18:00 |

| FRI | SAT | SUN |
|---|---|---|
| 17:00 | 12:00 | 0:00 |

[ CLOSE ]

FIG. 14

AUTOMATIC SHUTDOWN SETTING

Power will be turned off when the apparatus is not used for [ 2 hours. ]

(10 minutes to 8 hours)

[ CLOSE ]

IMAGE PROCESSING CONTROLLER FOR PERFORMING IMAGE PROCESSING IN COOPERATION WITH IMAGE FORMING APPARATUS, IMAGE FORMING SYSTEM INCLUDING IMAGE PROCESSING CONTROLLER, METHOD OF CONTROLLING IMAGE FORMING SYSTEM, AND STORAGE MEDIUM

BACKGROUND OF THE INVENTION

1. Field of the Invention

The present invention relates to an image processing controller for performing image processing in cooperation with an image forming apparatus, an image forming system including the image processing controller, a method of controlling the image forming system, and a storage medium, and more particularly to a technique for controlling the image forming system in which the image forming apparatus capable of shifting to a power saving state and the image processing controller perform image processing in cooperation with each other.

2. Description of the Related Art

As a demand for power saving of apparatuses increases, an image forming apparatus has come to be widely used which is equipped with a function of shifting to a power saving state on condition that the image forming apparatus has not been operated for a predetermined time period. For example, when a predetermined time period or longer has elapsed after termination of jobs, such as printing processing by a printer section or scanning processing by a scanner section or when a predetermined time period or longer has elapsed after termination of communication with an external apparatus, the image forming apparatus shifts from a normal standby state to the power saving state.

For such an image forming apparatus capable of shifting to the power saving state, there has been proposed a technique which prevents frequent return from the power saving state to the normal standby state (see e.g. Japanese Patent Laid-Open Publication No. 2012-203464). In this technique, it is determined whether or not packet information received in the power saving state satisfies conditions for inhibiting return from the power saving state, and if the packet information satisfies the inhibiting conditions, the image forming apparatus is inhibited from returning from the power saving state, to thereby prevent wasteful power consumption.

By the way, there has been proposed an image processing controller which is connected to the image forming apparatus, and performs image processing in cooperation with the image forming apparatus. Also when the image forming apparatus is connected to this image processing controller, there is a demand that in a case where no printing processing or the like has been performed for a predetermined time period or in a case where the image forming apparatus has not been accessed from other information processing apparatuses on a network, the image forming apparatus shifts to the power saving state, and power consumption is prevented from being caused by wasteful return from the power saving state.

However, in Japanese Patent Laid-Open Publication No. 2012-203464, whether or not the image forming apparatus is caused to return from the power saving state is determined based on only job information input in the power saving state, and hence the status of the image forming apparatus which is to be caused to return is not taken into account. Further, also in a case where the image processing controller is connected to the image forming apparatus, when the image processing controller receives a print job, the image forming apparatus is caused to return from the power saving state without taking the job and the status of the image forming apparatus into account, and the job is transmitted to the image forming apparatus. In a case where the image forming apparatus is thus caused to return from the power saving state without taking the status of the image forming apparatus into account, this results in causing the image forming apparatus to frequently return from the power saving state.

Further, the input of a job sometimes causes the image forming apparatus to return from the power saving state in spite of being incapable of immediately executing print processing, and can hinder the image forming apparatus from being powered off according to a setting of automatic power off.

SUMMARY OF THE INVENTION

The present invention provides a control technique which is capable of preventing an image forming apparatus from being caused to inefficiently return from a power saving state, and wastefully consuming electric power.

In a first aspect of the present invention, there is provided an image processing controller that performs image processing in cooperation with an image forming apparatus capable of shifting to a power saving state, comprising an acquisition unit configured to acquire a status of the image forming apparatus, a determination unit configured to determine, in a case where the image forming apparatus in the power saving state has received a job from an external apparatus, whether or not to cause the image forming apparatus to return from the power saving state, based on the status of the image forming apparatus acquired by the acquisition unit, a storage unit configured to store the job in a case where it is determined by the determination unit that there is no need to cause the image forming apparatus to return from the power saving state, and a transmission unit configured to transmit raster image data generated based on the job stored in the storage unit to the image forming apparatus, when the image forming apparatus has returned from the power saving state, wherein the transmission unit is configured to transmit raster image data generated based on the received job to the image forming apparatus, in a case where it is determined by the determination unit that there is need to cause the image forming apparatus to return from the power saving state.

In a second aspect of the present invention, there is provided an image forming system including an image forming apparatus capable of shifting to a power saving state, and an image processing controller that performs image processing in cooperation with the image forming apparatus, the image forming apparatus comprising a notifying unit configured to notify a status of the image forming apparatus, the image processing controller comprising an acquisition unit configured to acquire the status of the image forming apparatus notified by the notifying unit, a determination unit configured to determine, in a case where the image forming apparatus in the power saving state has received a job from an external apparatus, whether or not to cause the image forming apparatus to return from the power saving state, based on the status of the image forming apparatus acquired by the acquisition unit, a storage unit configured to store the job in a case where it is determined by the determination unit that there is no need to cause the image forming apparatus to return from the power saving state, and a transmission unit configured to transmit raster image data generated based on the job stored in the storage unit to the image forming apparatus, when the image forming apparatus has returned from the power saving state, wherein the transmission unit is configured to transmit raster image data generated based on the received job to the image forming apparatus, in a case where it is determined by the determination unit that there is need to cause the image forming apparatus to return from the power saving state.

In a third aspect of the present invention, there is provided a method of controlling an image forming system including an image forming apparatus capable of shifting to a power saving state, and an image processing controller that performs image processing in cooperation with the image forming apparatus, wherein the method comprises causing the image processing controller to acquire a status of the image forming apparatus, determine, in a case where the image forming apparatus in the power saving state has received a job from an external apparatus, whether or not to cause the image forming apparatus to return from the power saving state, based on the status of the image forming apparatus, store the job in a case where it is determined that there is no need to cause the image forming apparatus to return from the power saving state, transmit raster image data generated based on the stored job, when the image forming apparatus has returned from the power saving state, and transmit raster image data generated based on the received job, in a case where it is determined that there is need to cause the image forming apparatus to return from the power saving state.

In a fourth aspect of the present invention, there is provided a non-transitory computer-readable storage medium storing a computer-executable program for causing a computer to execute a method of controlling an image forming system including an image forming apparatus capable of shifting to a power saving state and an image processing controller that performs image processing in cooperation with the image forming apparatus, wherein the method comprises causing the image processing controller to acquire a status of the image forming apparatus, determine, in a case where the image forming apparatus in the power saving state has received a job from an external apparatus, whether or not to cause the image forming apparatus to return from the power saving state, based on the status of the image forming apparatus, store the job in a case where it is determined that there is no need to cause the image forming apparatus to return from the power saving state, transmit raster image data generated based on the stored job, when the image forming apparatus has returned from the power saving state, and transmit raster image data generated based on the received job, in a case where it is determined that there is need to cause the image forming apparatus to return from the power saving state.

According to the present invention, when the image forming apparatus receives a job in the power saving state, the image processing controller determines whether or not to cause the image forming apparatus to return from the power saving state, based on the status of the image forming apparatus. If it is determined that there is no need to cause the image forming apparatus to return from the power saving state, the image processing controller stores the received job, and when the image forming apparatus returns from the power saving state, transmits the stored job to the image forming apparatus. In a case where it is determined that there is need to cause the image forming apparatus to return from the power saving state, the image processing controller transmits raster image data generated based on the received job to the image forming apparatus. This makes it possible to prevent the image forming apparatus from being caused to inefficiently shift from the power saving state, and wastefully consume electric power.

Further features of the present invention will become apparent from the following description of exemplary embodiments (with reference to the attached drawings).

BRIEF DESCRIPTION OF THE DRAWINGS

FIG. 12 is a view of an example of a notification screen for notifying that the job subjected to the postponed printing has been printed.

FIG. 13 is a view of an example of a weekly shutdown configuration screen.

FIG. 14 is a view of an example of an automatic shutdown configuration screen.

DESCRIPTION OF THE EMBODIMENTS

The present invention will now be described in detail below with reference to the accompanying drawings showing embodiments thereof.

Figure 1:
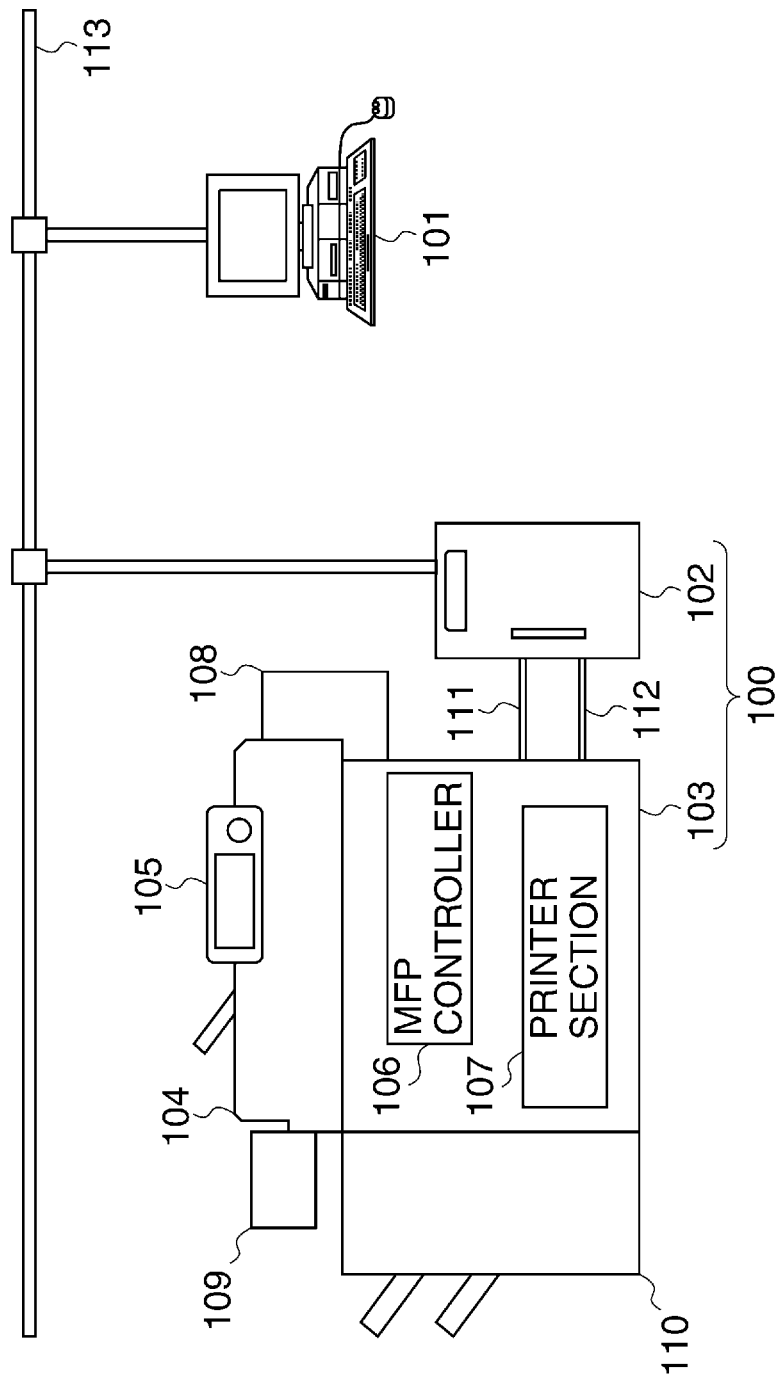
FIG. 1 is a block diagram showing the overall configuration of an image forming system including an image processing controller according to a first embodiment of the present invention.

FIG. 1 is a block diagram showing the overall configuration of an image forming system including an image processing controller according to a first embodiment of the present invention.

The image forming system, denoted by reference numeral 100, comprises the image processing controller, denoted by reference numeral 102, which performs image processing in cooperation with an image forming apparatus 103, and the image forming apparatus 103 which is an MFP (multifunction peripheral). The image forming system 100 is communicably connected to a client computer (PC) 101 connected to an Ethernet (registered trademark) cable 113. The PC 101 starts an application and issues a print instruction and the like to the image forming apparatus 103.

The PC 101 and the image processing controller 102 are communicably connected via the Ethernet (registered trademark) cable 113. The image processing controller 102 and the image forming apparatus 103 are connected via a control cable 111 and an image video cable 112.

In the present embodiment, the image forming apparatus 103 is not directly connected to the Ethernet (registered trademark) cable 113. That is, the image forming apparatus 103 and the PC 101 communicate with each other via the image processing controller 102. Note that the image forming apparatus 103 may be connected to the Ethernet (registered trademark) cable 113. That is, the image forming apparatus 103 may be directly and communicably connected to the PC 101.

Figure 2:
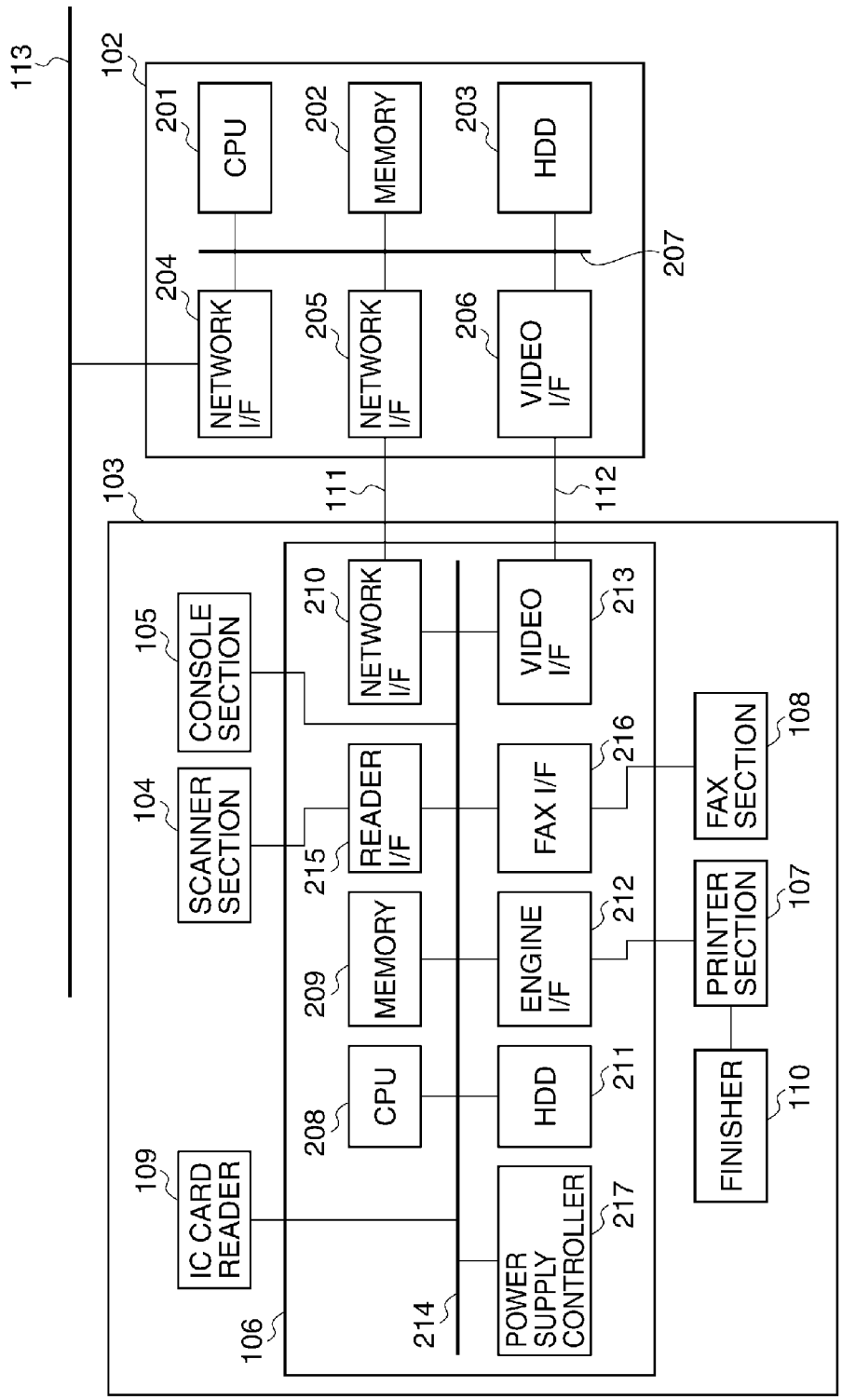
FIG. 2 is a block diagram showing the hardware configuration of an image forming apparatus and the image processing controller appearing in FIG. 1.

FIG. 2 is a block diagram of the hardware configuration of the image forming apparatus 103 and the image processing controller 102 appearing in FIG. 1.

The image forming apparatus 103 includes a scanner section 104, a console section 105, an MFP controller 106, a printer section 107, a FAX section 108, an IC card reader 109, and a finisher 110.

The scanner section 104 reads an original, and inputs image data obtained by reading the original to the MFP controller 106. The console section 105 includes various kinds of keys and a display panel (none of which are shown), and receives various instructions from a user via the keys. Further, the console section 105 displays various kinds of information on the display panel.

The MFP controller 106 controls the scanner section 104, the printer section 107, and so forth. The MFP controller 106 will be described in detail hereinafter.

The printer section 107 performs printing on sheets based on the image data. The FAX section 108 is connected to a telephone line, not shown, and performs inputting and outputting information and data to and from a facsimile machine e.g. via the telephone line. The IC card reader 109 reads information from an IC card for identifying the user. The finisher 110 receives sheets having images formed thereon by the printer section 107, and performs discharging, sorting, stapling, punching, cutting, or like processing of the received sheets.

The image forming apparatus 103 is capable of executing a copy function, a send function, a box function, and a print function. The copy function is a function of storing the image data of the original read by the scanner section 104 in an HDD 211, and printing images on sheets based on the image data using the printer section 107. The send function is a function of sending the image data of the original read by the scanner section 104 to the PC 101 via a network. The box function is a function of storing the image data of the original read by the scanner section 104 in the HDD 211, or storing image data sent from the PC 101 in the HDD 211. The print function is a function of interpreting and printing a PDL (page description language) sent from the PC 101 using the printer section 107.

Next, a description will be given of details of the configuration of the MFP controller 106 appearing in FIG. 2.

The MFP controller 106 comprises a CPU 208, a memory 209, a network interface (NW I/F) 210, the HDD 211, an engine interface 212, a video interface 213, a reader interface 215, a FAX interface 216, and a power supply controller 217.

The CPU 208 performs control of the sections of the image forming apparatus 103 via a system bus 214, various kinds of computations, and execution of programs stored in storage devices (the memory 209 and the HDD 211). The memory 209 is used as a work memory by the CPU 208.

The network interface 210 transmits and receives control commands to and from the image processing controller 102 via the control cable 111. The HDD 211 is a large-capacity storage device, and stores various control programs to be executed by the CPU 208 and image data.

The engine interface 212 transmits and receives control commands to and from the printer section 107. The video interface 213 transmits and receives image data to and from the image processing controller 102 via the image video cable 112. The reader interface 215 transmits and receives control commands to and from the scanner section 104. The FAX interface 216 is connected to the FAX section 108. The power supply controller 217 controls supply of power to the sections of the image forming apparatus 103.

Next, a description will be given of details of the configuration of the image processing controller 102 appearing in FIG. 2. The image processing controller 102 generates image data based on a job received from an external apparatus via the network, and sets the image data to the image forming apparatus 103.

The image processing controller 102 comprises a CPU 201, a memory 202, an HDD 203, network interfaces (NW I/F) 204 and 205, and a video interface 206.

The CPU 201 performs control of the sections of the image processing controller 102 via a system bus 207, various kinds of computations, and execution of programs stored in storage devices (the memory 202 and the HDD 203). The memory 202 is used as a work memory by the CPU 201. The HDD 203 is a large-capacity storage device, and stores various control programs executed by the CPU 201 and image data. The network interface 204 communicates with other apparatuses, such as the PC 101, via the Ethernet (registered trademark) cable 113. The network interface 205 transmits and receives control commands to and from the image forming apparatus 103 via the control cable 111. The video interface 206 transmits and receives image data to and from the image forming apparatus 103 via the image video cable 112.

Next, the power supply configuration of the image forming apparatus 103 will be described with reference to FIG. 3.

Figure 3:
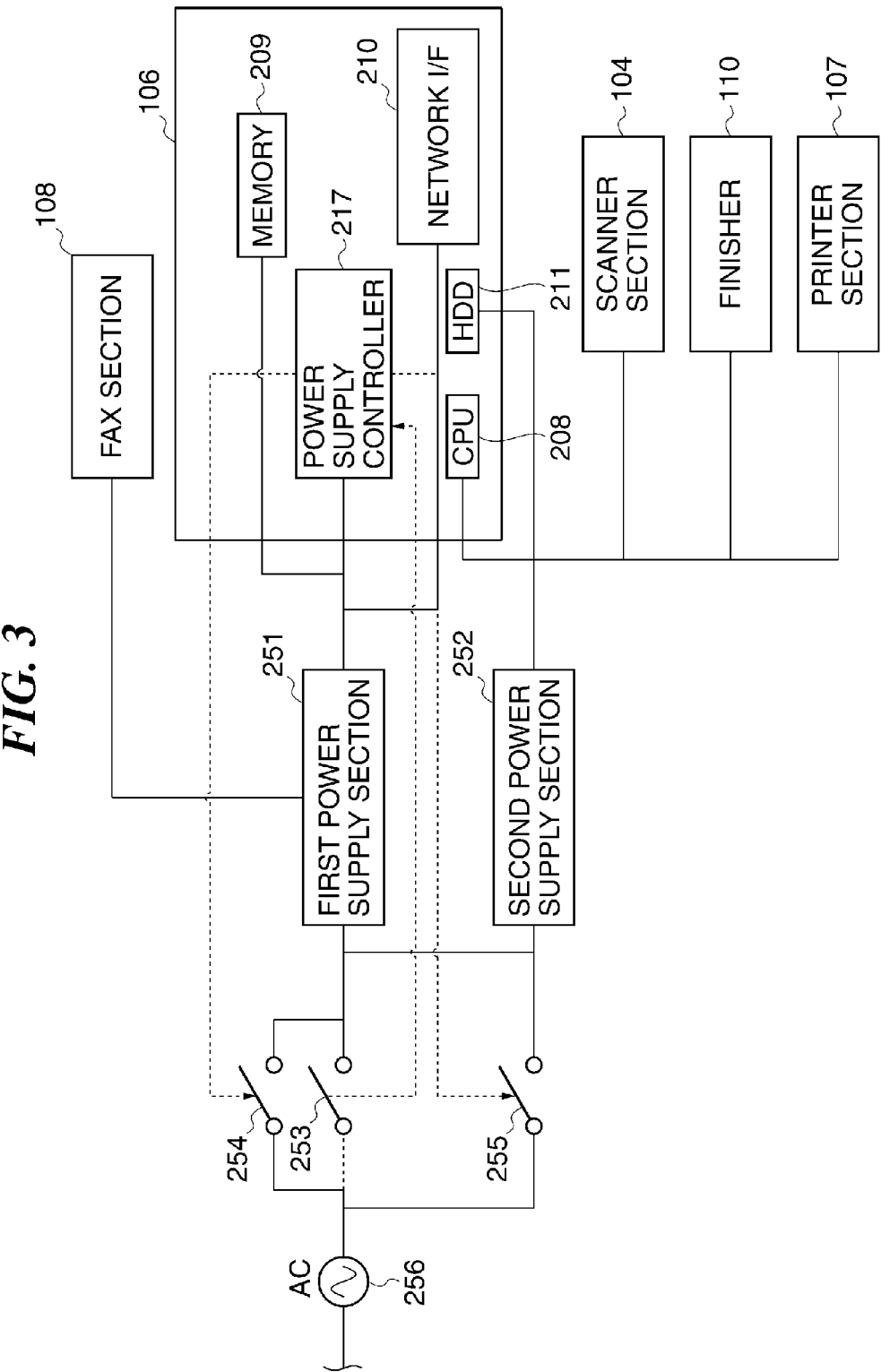
FIG. 3 is a block diagram of power supply sections of the image forming apparatus.

FIG. 3 is a block diagram of power supply sections of the image forming apparatus 103.

The image forming apparatus 103 comprises a first power supply section 251 for a small-capacity power supply and a second power supply section 252 for a large-capacity power supply. The first power supply section 251 converts AC power supplied from an AC power supply 256 to DC power (e.g. 3.3V). This DC power is supplied to the FAX section 108, the power supply controller 217, the memory 209, the network interface 210, and so forth. Further, the second power supply section 252 converts AC power supplied from the AC power supply 256 to DC power (e.g. 12V or 24V). This DC power is supplied to the printer section 107, the scanner section 104, the finisher 110, the CPU 208, the HDD 211, and the like.

A seesaw switch 253 and a relay 254 are provided between the AC power supply 256 and the first power supply section 251. Further, a relay 255 is provided between the AC power supply 256 and the second power supply section 252. The seesaw switch 253 is turned on or off in response to a user operation. The state (OFF or ON state) of the seesaw switch 253 is notified to the power supply controller 217, referred to hereinafter.

The power supply controller 217 detects the state (OFF or ON state) of the seesaw switch 253. Further, the relays 254 and 255 are switched between ON and OFF by the power supply controller 217.

The power supply controller 217 turns on the relays 254 and 255. This causes electric power to be supplied from the first and second power supply sections 251 and 252 to the respective sections, such as the printer section 107, the scanner section 104, and the finisher 110, whereby the image forming apparatus 103 shifts to a standby state.

Further, the power supply controller 217 turns on the relay 254, and also turns off the relay 255. As a consequence, supply of electric power from the second power supply section 252 to the printer section 107, the scanner section 104, etc. is stopped, whereby the image forming apparatus 103 shifts to a power saving state. In the power saving state, electric power is supplied to limited sections, such as the power supply controller 217, the memory 209, and the network interface 210, and supply of electric power to the other sections is stopped.

Next, the software configuration of the image processing controller 102 will be described with reference to FIG. 4.

Figure 4:
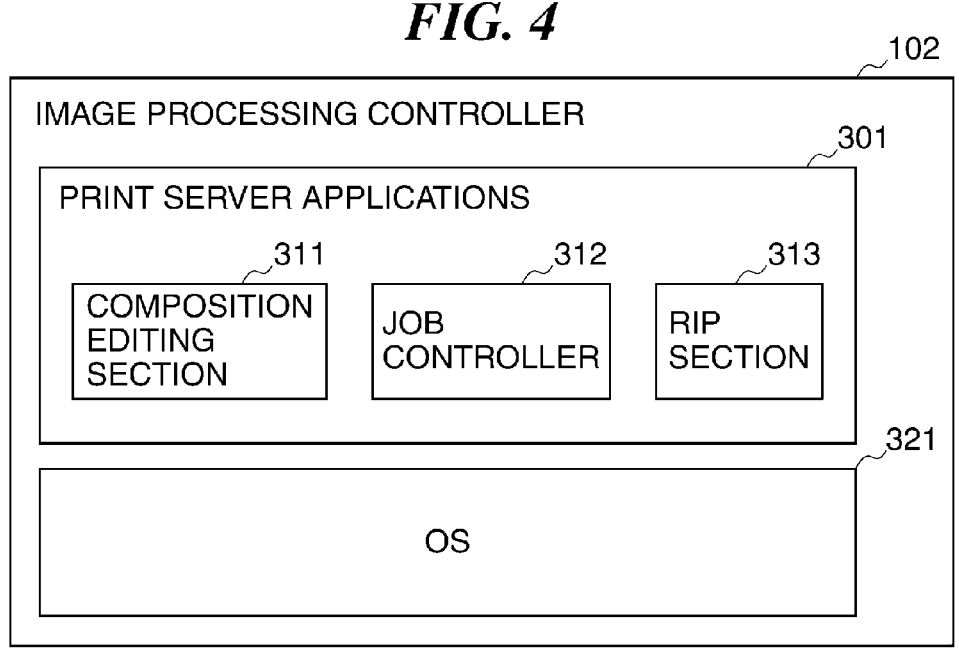
FIG. 4 is a block diagram of the software configuration of the image processing controller.

FIG. 4 is a block diagram of the software configuration of the image processing controller 102. Note that each software component appearing in FIG. 4 is realized by the CPU 201 reading a program from the memory 202 or the HDD 203 of the image processing controller 102 and executing the program.

An operating system (OS) 321 is basic software of the image processing controller 102. A print server application 301 is application software operating on the OS 321 executed by the CPU 201. The print server application 301 comprises a composition editing section 311, a job controller 312, and a RIP (Raster Image Processor) section 313, and executes various kinds of predetermined processing including image processing.

The composition editing section 311 performs composition editing processing for editing image data of each page into a bookbinding composition format based on instructions from the PC 101. The job controller 312 controls print jobs based on instructions from the PC 101. Specifically, the job controller 312 receives print data of print jobs from the PC 101, issues instructions concerning the print jobs, and controls a printing order of the print jobs. The RIP section 313 converts PDL (Page Description Language) data to a printable raster image when the composition editing section 311 performs the composition editing processing or when the job controller 312 performs actual image forming processing.

Figure 5:
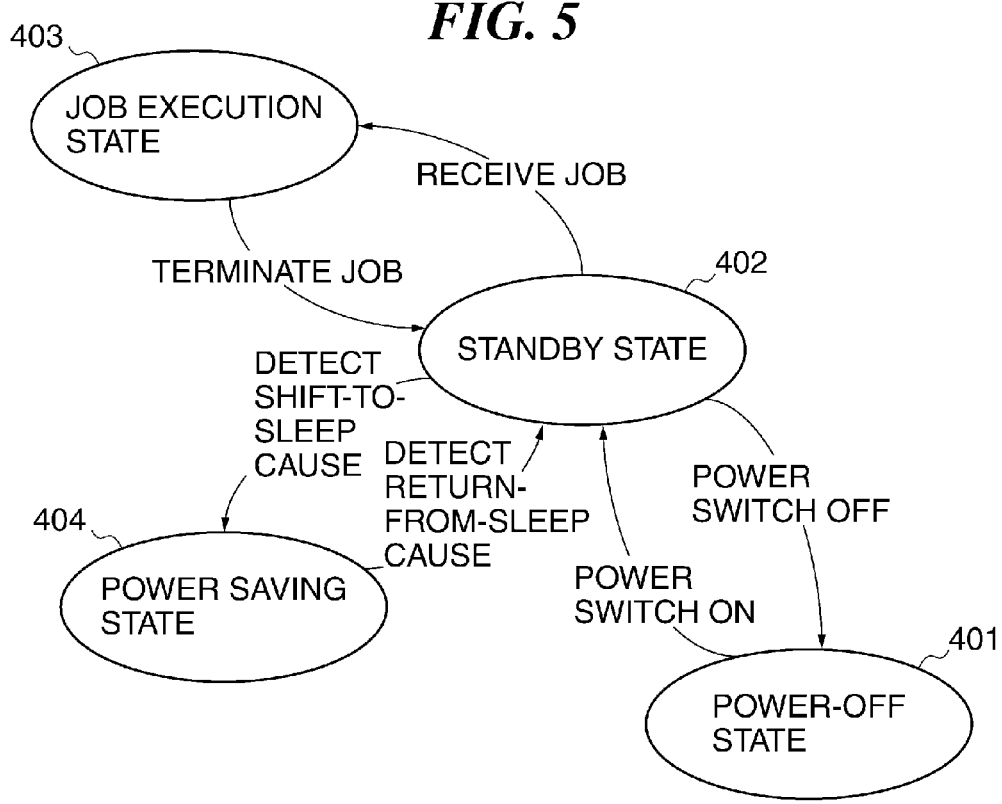
FIG. 5 is a state transition diagram illustrating transition of a power state of the image forming apparatus.

FIG. 5 is a state transition diagram illustrating transition of a power state of the image forming apparatus 103.

The image forming apparatus 103 is set to one of power states including a power-off state 401, a standby state 402, a job execution state 403, and a power saving state (sleep state) 404. Although in the present embodiment, a description is given of the above four power states, this is not limitative, but the image forming apparatus 103 may be set to any other suitable power state. For example, the image forming apparatus 103 may be set to a suspended state or a hibernation state.

The hibernation state is a state in which the image forming apparatus 103 can promptly return to the standby state 402. The hibernation state is similar to the power-off state 401 in that supply of electric power to sections of the image forming apparatus 103 is stopped, but is different from the power-off state 401 in that a status of the image forming apparatus 103 is stored in the HDD 211 before the image forming apparatus 103 shifts to the hibernation state. The image forming apparatus 103 performs prompt return from the hibernation state to the standby state 402 based on the information stored in the HDD 211.

An order of the power states of the image forming apparatus 103 arranged in decreasing order of power consumption is the job execution state 403>the standby state 402>the power saving state 404>the power-off state 401.

The power-off state 401 is a state in which the seesaw switch 253 of the image forming apparatus 103 is off. In the power-off state 401, supply of electric power to all the electrical components of the image forming apparatus 103 is stopped. When the user turns on the seesaw switch 253 in the power-off state 401, the image forming apparatus 103 is started up to shift to the standby state 402.

The standby state 402 is a state in which the image forming apparatus 103 is on standby for execution of a job. In the standby state 402, electric power is supplied to all the electrical components of the image forming apparatus 103. Note that in the standby state 402, it is not necessarily required to supply electric power to all the electrical components of the image forming apparatus 103, but electric power may be supplied to essential electrical components and not to the others (such as the console section).

In the standby state 402, upon receipt of a job from the PC 101 via the image processing controller 102, the image forming apparatus 103 shifts to the job execution state 403. Further, in the standby state 402, when any of shift-to-sleep causes occurs, the image forming apparatus 103 shifts to the power saving state 404.

The following operations correspond to the shift-to-sleep causes:

Cause 1: when the user presses a shift-to-sleep button (not shown)

Cause 2: when a predetermined time period has elapsed in the standby state 402 without execution of a print job or a scan job Cause 3: when a predetermined time period has elapsed in a state in which a remote user interface (UI) of the image forming apparatus 103 is not accessed by the PC 101

Further, when the user turns off the seesaw switch 253 in the standby state 402, a shutdown process is executed, whereby the image forming apparatus 103 shifts to the power-off state 401. The shutdown process terminates the OS and applications to shut down the image forming apparatus 103.

The job execution state 403 is a state in which the image forming apparatus 103 is executing a job, and electric power is supplied to all the electrical components of the image forming apparatus 103. Note that in the job execution state 403 as well, it is not necessarily required to supply electric power to all the electrical components of the image forming apparatus 103, but electric power may be supplied to essential electrical components and not to the others (such as the console section). Further, the job execution state 403 may be set such that no electric power is supplied to units which are not used to execute a job. Specifically, when a print job for forming images on sheets is being executed, supply of electric power e.g. to the console section 105 and the scanner section 104 which are not used for execution of the print job may be stopped. When the print job is terminated in the job execution state 403, the image forming apparatus 103 shifts to the standby state 402.

The power saving state 404 is a state in which the image forming apparatus 103 is on standby while saving electric power, and electric power is supplied to some of the electrical components of the MFP controller 106, including the network interface 210, out of the electrical components of the image forming apparatus 103. In this power saving state 404, supply of electric power e.g. to the scanner section 104, the printer section 107, and the console section 105 is stopped.

In the power saving state 404, when any of return-from-sleep causes occurs, the image forming apparatus 103 shifts to the standby state 402. Note that the image forming apparatus 103 is capable of responding to a simple packet received via the network while remaining in the power saving state 404. This function is referred to as a proxy response. Examples of the simple packet include an ARP (Address Resolution Protocol) request packet, an SNMP (Simple Network Management Protocol) status acquisition packet, an ICMP (Internet Control Message Protocol) neighbor discovery packet, and the like.

As the return-from-sleep causes, there apply the following operations:

Operation 1: pressing a return-from-sleep button (not shown) by a user

Operation 2: receipt of a job from the PC 101

Operation 3: receipt of facsimile from an external device

Next, a description will be given of a shift-to-sleep control process executed by the image forming apparatus 103 when the image forming apparatus 103 shifts from the standby state 402 to the power saving state 404, with reference to FIG. 6.

Figure 6:
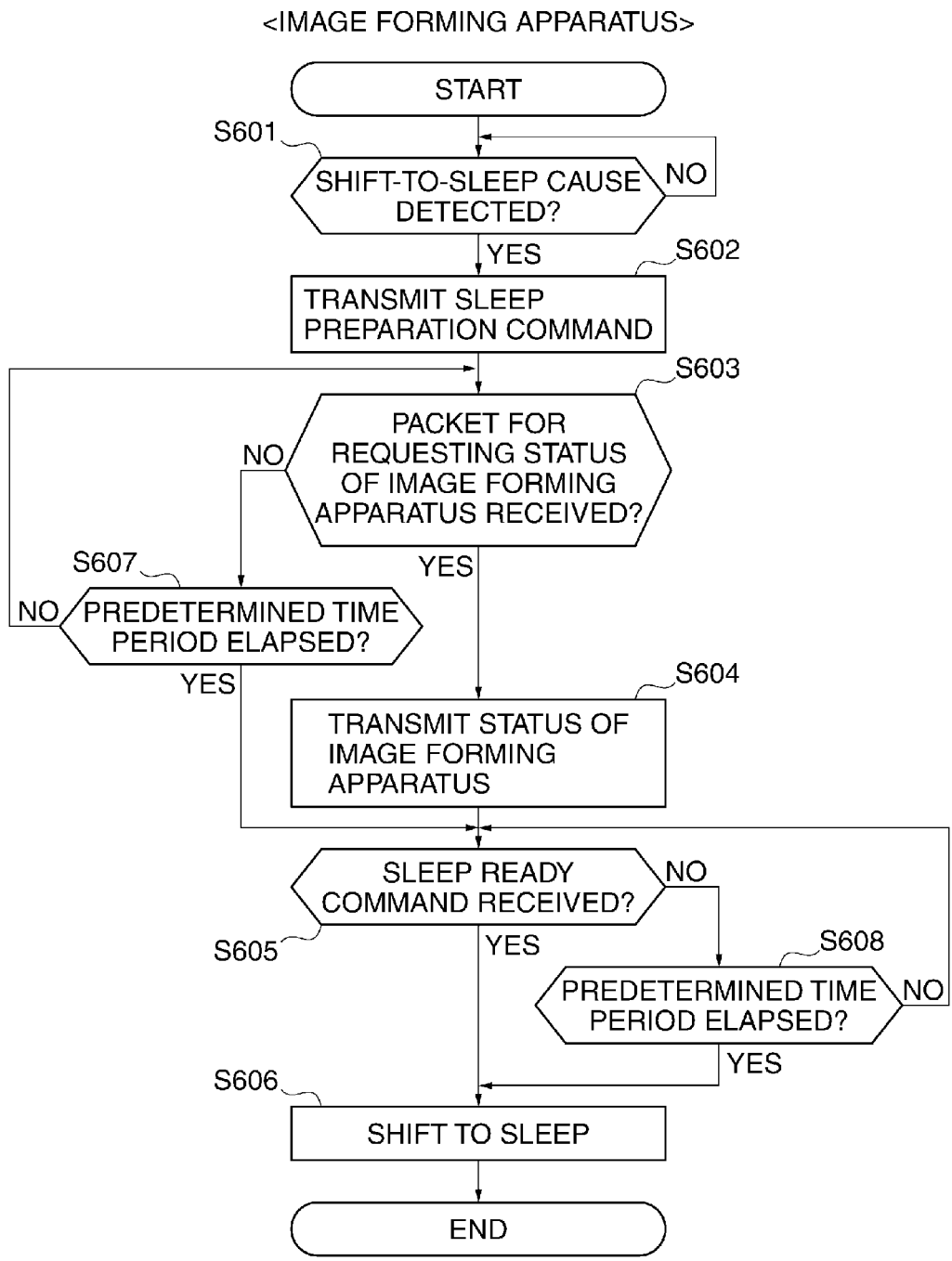
FIG. 6 is a flowchart of a shift-to-sleep control process executed by the image forming apparatus when shifting to a power saving state.

FIG. 6 is a flowchart of the shift-to-sleep control process executed by the image forming apparatus 103 when the apparatus shifts to the power saving state 404. Note that the shift-to-sleep control process shown in FIG. 6 is realized by the CPU 208 executing a program loaded into the memory 209.

After the image forming apparatus 103 shifts to the standby state 402 e.g. after execution of a job, the CPU 208 determines whether or not any of the shift-to-sleep causes has been detected (step S601). The CPU 208 repeats the step S601 until any of the shift-to-sleep causes is detected (NO to the step S601). When any of the shift-to-sleep causes has been detected (YES to the step S601), the CPU 208 causes the network interface 210 to transmit a sleep preparation command (step S602). The sleep preparation command is a command for requesting the image processing controller 102 to stop periodical acquisition of information from the image forming apparatus 103 in order for the image forming apparatus 103 to shift to the power saving state 404. The sleep preparation command is transmitted to the image processing controller 102 via the control cable 111 (step S602).

Next, the CPU 208 determines whether or not an acquisition request packet for requesting acquisition of the status of the image forming apparatus 103 has been received from the image processing controller 102 (step S603). If it is determined that the acquisition request packet has been received (YES to the step S603), the CPU 208 generates a packet indicative of the status of the image forming apparatus 103, and causes the network interface 210 to transmit the generated packet (step S604).

Next, the CPU 208 determines whether or not a sleep ready command has been received from the image processing controller 102 as response information to the transmitted sleep preparation command (step S605). Upon receipt of the sleep ready command (YES to the step S605), the CPU 208 causes the image forming apparatus 103 to shift from the standby state 402 to the power saving state 404 (step S606). Specifically, the CPU 208 instructs the power supply controller 217 to turn off the relay 255. As a consequence, the relay 255 is turned off, whereby supply of electric power to the printer section 107 and the scanner section 104 is stopped. The CPU 208 executes a shift-to-sleep process before the supply of electric power is stopped by the power supply controller 217. In the shift-to-sleep process, a status of the image forming apparatus 103 immediately before the apparatus shifts to the power saving state 404 is stored in the memory 209.

On the other hand, if it is determined in the step S603 that the acquisition request packet for requesting acquisition of the status of the image forming apparatus 103 has not been received (No to the step S603), the CPU 208 determines whether or not a predetermined time period has elapsed after transmission of the sleep preparation command (step S607). If the predetermined time period has not elapsed (NO to the step S607), the CPU 208 returns to the step S603, whereas if the predetermined time period has elapsed (YES to the step S607), the CPU 208 proceeds to the step S605 instead of transmitting the packet indicative of the status of the image forming apparatus 103.

Even when it is determined in the step S605 that the sleep ready command has not been received (NO to the step S605), if a predetermined time period elapses (YES to a step S608), the CPU 208 executes the shift-to-sleep process (step S606).

Next, a description will be given of a sleep preparation control process executed by the image processing controller 102 when the image forming apparatus 103 shifts from the standby state 402 to the power saving state 404, with reference to FIG. 7.

Figure 7:
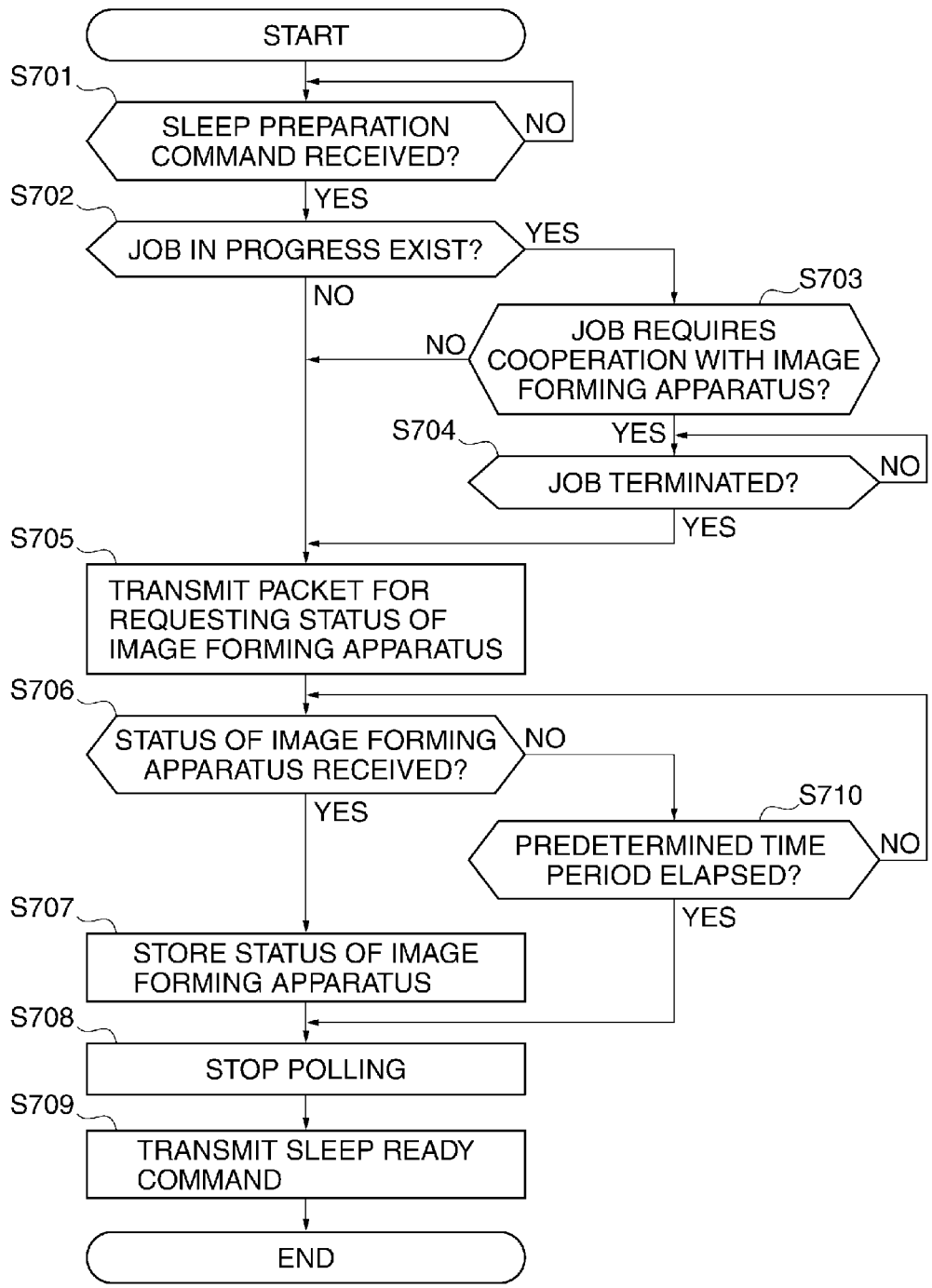
FIG. 7 is a flowchart of a sleep preparation control process executed by the image processing controller when shifting to the power saving state.

FIG. 7 is a flowchart of the sleep preparation control process executed by the image processing controller 102 when the apparatus shifts to the power saving state 404. Note that the sleep preparation control process shown in FIG. 7 is realized by the CPU 201 executing a program loaded into the memory 202.

First, the CPU 201 determines whether or not the sleep preparation command transmitted from the image forming apparatus 103 has been received (step S701). Unless the sleep preparation command is received (NO to the step S701), the CPU 201 repeats the step S701. When it is determined that the sleep preparation command has been received (YES to the step S701), the CPU 201 determines whether or not there is a job in progress (step S702). If it is determined that there is a job in progress (YES to the step S702), the CPU 201 checks the type of the job in progress (step S703). In the step S703, the CPU 201 determines whether or not the type of the job in progress requires cooperation with the image forming apparatus 103. Jobs of the type requiring cooperation with the image forming apparatus 103 include a print job and a scan job. Further, a job which is stored in a box (HDD 211) of the image forming apparatus 103 but is not printed is also a job requiring cooperation with the image forming apparatus 103. On the other hand, jobs which do not require cooperation with the image forming apparatus 103 include a hold job in which only the RIP processing is performed by the image processing controller 102.

If it is determined in the step S703 that the type of the job in progress requires cooperation with the image forming apparatus 103 (YES to the step S703), the CPU 201 determines whether or not the job in progress has been terminated (step S704). Here, unless the job in progress has been terminated (NO to the step S704), the CPU 201 repeats the step S704. When the job in progress has been terminated (YES to the step S704), the CPU 201 executes a step S705. Note that when the job in progress is a print job which requires the image processing controller 102 to perform RIP processing and transmission to the image forming apparatus 103, the CPU 201 performs the following control: When the image processing controller 102 has terminated the RIP processing, the CPU 201 determines that the job in progress has been terminated. Further, if the image processing controller 102 receives the sleep preparation command before transmitting RIP-processed image data to the image forming apparatus 103, the image processing controller 102 executes the RIP processing until it is completed, but does not transmit RIP-processed image data to the image forming apparatus 103. On the other hand, if the image processing controller 102 receives the sleep preparation command after starting to transmit RIP-processed image data to the image forming apparatus 103, the image processing controller 102 does not suspend the transmission of the RIP-processed image data, but executes the step S705 after completion of transmission of the RIP-processed image data.

If it is determined in the step S703 that the type of the job in progress does not require cooperation with the image forming apparatus 103 (NO to the step S703), the CPU 201 immediately executes the step S705. Further, if it is determined in the step S702 that there is no job in progress (NO to the step S702), the CPU 201 also immediately executes the step S705.

In the step S705, to acquire a status of the image forming apparatus 103, the CPU 201 causes the network interface 205 to transmit an apparatus status request packet (step S705). Then, the CPU 201 determines whether or not a packet indicative of the status of the image forming apparatus 103 has been received from the image forming apparatus 103 (step S706). If it is determined that the packet indicative of the status of the image forming apparatus 103 has been received (YES to the step S706), the CPU 201 stores the status of the image forming apparatus 103 in the memory 202 or the HDD 203 (step S707). For example, sheet information (sheet types, sheet sizes, remaining amounts) of sheets in sheet feeders is stored in the memory 202 or the HDD 203 as the status of the image forming apparatus 103. Further, in the step S707, the status of the image processing controller 102 is stored in the memory 202 or the HDD 203.

Next, the CPU 201 controls the network interface 205 such that the image processing controller 102 stops periodically acquiring information of the image forming apparatus 103 (step S708). Specifically, the CPU 201 controls the network interface 205 such that the image processing controller 102 stops periodically (e.g. at intervals of 60 seconds) acquiring an MIB (Management Information Base) of the image forming apparatus 103 by polling the image forming apparatus 103. The CPU 201 stops acquisition of sheet feeder information (sheet types, sheet sizes), the remaining amounts of sheets, the remaining amounts of toner, a location (place where the image forming apparatus 103 is installed), sheet discharge information (output bins, presence/absence of sheets, full stack), and error information (paper jam, failure information, etc.). The above-mentioned sleep preparation command is a command for requesting the network interface 205 to stop periodical acquisition of the MIB of the image forming apparatus 103.

In the present embodiment, the image processing controller 102 may stop acquiring the whole of the MIB of the image forming apparatus 103 or part of the MIB thereof. The image forming apparatus 103 is capable of responding to part of a request for acquiring the MIB from the image processing controller 102 without returning from the power saving state 404 to the standby state 402 (this function is referred to as the proxy response). In the proxy response, the network interface 210 of the image forming apparatus 103 responds to inquiry from the image processing controller 102. Therefore, in the present embodiment, the image processing controller 102 continues acquisition of part of the MIB to which the image forming apparatus 103 can perform proxy response, without totally stopping acquisition of the MIB.

After the image processing controller 102 has stopped periodical acquisition of information from the image forming apparatus 103, the CPU 201 causes the network interface 205 to transmit the sleep ready command (step S709). Upon receipt of the sleep ready command, the image forming apparatus 103 shifts from the standby state 402 to the power saving state 404.

After the network interface 205 has transmitted the apparatus status request packet, if a state in which the CPU 201 cannot acquire a packet indicative of the status of the image forming apparatus 103 (NO to the step S706) has continued for a predetermined time period (YES to a step S710), the CPU 201 directly proceeds to the step S708. In this case, the CPU 201 does not store the status of the image forming apparatus 103 immediately before the image forming apparatus 103 shifts to the power saving state 404.

Next, a description will be given of operations of the image forming apparatus 103 and the image processing controller 102 performed when the image forming apparatus 103 returns from the power saving state 404 to the standby state 402.

In the image forming system 100, the image forming apparatus 103 is caused to return from the power saving state 404 to the standby state 402 in response to an operation of the image forming apparatus 103 as a trigger or in response to an operation of the image processing controller 102 as a trigger.

First, a description will be given of a received job-handling control process which is executed by the image processing controller 102 upon receipt of a job when the image forming apparatus 103 is in the power saving state 404, with reference to FIG. 8.

Figure 8:
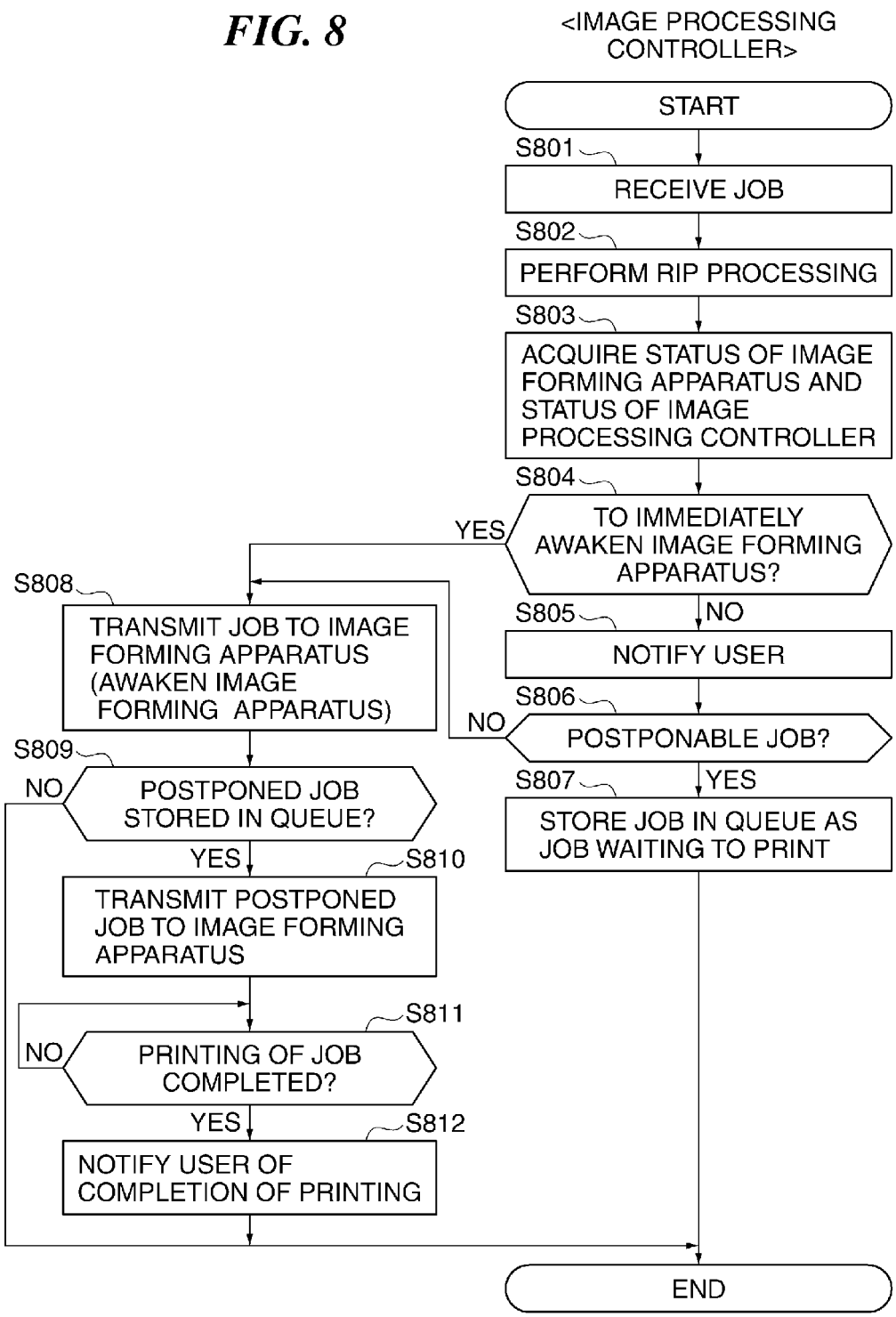
FIG. 8 is a flowchart of a received job-handling control process executed by the image processing controller when the image processing controller has received a job.

FIG. 8 is a flowchart of the received job-handling control process executed by the image processing controller 102 upon receipt of a job. Note that the received job-handling control process shown in FIG. 8 is realized by the CPU 201 executing a program loaded into the memory 202.

The CPU 201 receives a job e.g. from the PC 101 via the network interface 204 (step S801). Next, the CPU 201 performs RIP processing of the received job (step S802). Then, the CPU 201 acquires the status of the image forming apparatus 103 and the status of the image processing controller 102 stored in the memory 202 or the HDD 203 (step S803). The status of the image forming apparatus 103 acquired in the step S803 includes a power state of the image forming apparatus 103, printer information including a product name and a version of the image forming apparatus 103, information on the arrangement of the image forming apparatus 103 (the arrangement of a sheet feed section, the arrangement of a sheet discharge section, and so forth), information on network settings, information on the remaining amounts of sheets stored in the sheet feed section, time information, and error information of the image forming apparatus 103 (including toner-out information, paper-out information, degradation information of the printer section 107, the scanner section 104, and so forth).

Next, the CPU 201 determines, based on the acquired statuses of the image forming apparatus 103 and the image processing controller 102, whether or not to transmit the received job to the image forming apparatus 103 to thereby cause the image forming apparatus 103 to immediately return from the power saving state 404 (awaken the image forming apparatus 103) (step S804). For example, the CPU 201 determines from the status of the image forming apparatus 103 stored in the memory 202 whether or not weekly shutdown (time-designated power-off function) of the image forming apparatus 103 is set such that it is to be executed in several minutes. In a case where the job is input to the image forming apparatus 103 when the weekly shutdown is set to be executed in several minutes, power-off is executed only after completion of outputting of the job. Therefore, there is a larger possibility that the power-off is delayed from scheduled time as the amount of the input job is larger. To avoid this, in the present embodiment, it is judged that printing of a job can be postponed in a case where the job is received within a predetermined time period before a set time of the weekly shutdown.

The weekly shutdown function is one of power supply management functions of the image forming apparatus 103 for reducing power consumption caused by unnecessary operation, which enables the power of the image forming apparatus 103 to be automatically turned off at a designated time point. An example of a weekly shutdown configuration screen is shown in FIG. 13.

With the weekly shutdown function, it is possible to automatically turn off the power of the image forming apparatus 103 at a user-designated time on each day of the week. When there is a job printing of which is to be in progress at the time of the power off, the power of the image forming apparatus 103 is turned off after completion of printing of the job. Therefore, when a print job for printing a large number of pages is input immediately before the set time of the weekly shutdown, the power of the image forming apparatus 103 cannot be turned off until completion of printing all the pages, which takes time before execution of the power-off, whereby power consumption occurs during the time period. For this reason, when a low-priority job printing of which can be postponed is input immediately before the weekly shutdown, it is desirable to preferentially execute power-off by taking precedence over the input low-priority job, and execute printing of the job when the power of the image forming apparatus 103 is restored.

Further, also when an automatic shutdown function (automatic power off) is set, it is judged similarly to the case of the weekly shutdown. That is, it is judged that printing of the input job can be postponed when the power of the image forming apparatus 103 is to be turned off by the automatic shutdown function in several minutes.

The automatic shutdown function is one of the power supply management functions of the image forming apparatus 103 for reducing power consumption. This function automatically turns off the power of the image forming apparatus when the image forming apparatus 103 has not been used for a predetermined time period (ranging e.g. from 10 minutes to eight hours). An example of an automatic shutdown configuration screen is shown in FIG. 14.

As long as the automatic shutdown function is set, time is counted after latest execution of processing by the image forming apparatus 103, such as a user operation, printing, copying, and the like. Therefore, in a case the job has been input even immediately before automatic shutdown, counting of the automatic shutdown is started from zero, and hence also when the automatic shutdown function is set, it is desirable to apply the same processing as applied to the weekly shutdown function to this function. When the job has been input immediately before the time of the power off, it is judged whether or not the job can be postponed, whereby when the job is a low-priority print job, the job is caused to be printed after the power of the image forming apparatus is restored. This processing makes it possible to give a higher priority to the automatic shutdown function of the image forming apparatus 103 and thereby reduce power consumption.

Further, after the RIP processing, the image processing controller 102 compares sheet feeder information set in the image forming apparatus 103 and sheets to be used for the job, and when it is judged that required sheets are not set in any sheet feeder of the image forming apparatus 103, the input job is set to a suspended job. In such a case, it is impossible to actually execute printing before the user replaces sheets in a sheet feeder by the required sheets, the CPU 201 determines that printing of the input job can be postponed.

Further, if a time point set by the image forming apparatus 103 or the image processing controller 102 for starting to perform scheduled printing is several minutes after inputting of a job, the CPU 201 judges that printing of the input job can be postponed. This is because by causing the image forming apparatus 103 to return from the power saving state 404 for execution of scheduled printing, and executing postponed printing of the input job after execution of printing of a job set to be subjected to scheduled printing, it is possible to prevent the image forming apparatus 103 from unnecessarily repeatedly returning from the power saving state. This makes it possible to prevent wasteful power consumption.

Figure 15:
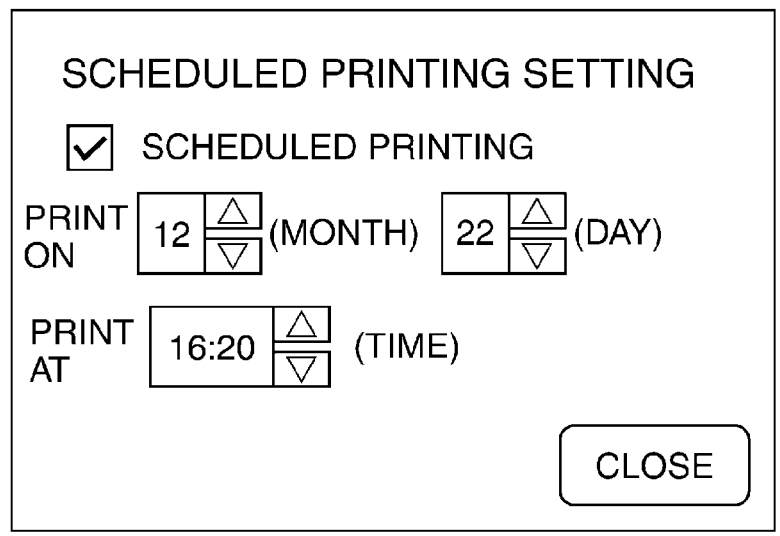
FIG. 15 is a view of an example of a scheduled printing configuration screen.

The scheduled printing function is a function of setting a time point for starting printing of an input job. An example of a scheduled printing configuration screen is shown in FIG. 15.

When a job set to be subjected to scheduled printing has been input to the image processing controller 102, the image processing controller 102 inputs the job to the image forming apparatus 103 at a printing time set for the job. At this time, even when the image forming apparatus 103 is in the power saving state, the image processing controller 102 causes the image forming apparatus 103 to return from the power saving state, and inputs the job to the image forming apparatus 103. For example, assuming that the time point for printing a job set to be subjected to scheduled printing is 10 minutes after inputting of a job to the processing controller 102, the image processing controller 102 causes the image forming apparatus 103 to once return from the power saving state to thereby perform printing of the input job first, and if there is time before execution of the scheduled printing, the image processing controller 102 causes the image forming apparatus 103 to shift to the power saving state again. Since it is necessary to cause the image forming apparatus 103 to return from the power saving state again at the time of execution of the scheduled printing, repetition of shifting to and returning from the power saving state causes further power consumption. To prevent such wasteful power consumption, in a case where a job printing of which can be postponed is input, the job is set to be printed after execution of printing of the job set to be subjected to scheduled printing. This processing makes it possible to performing print two jobs per single return processing for causing the image forming apparatus 103 to return from the power saving state when executing printing of the job for scheduled printing, thereby making it possible to reduce power consumption. Further, it is also possible to prevent a hard disk from being worn by frequent return from the power saving state to the standby state 402.

When any of the weekly shutdown, the automatic shutdown, the suspended job, and the scheduled printing has been set, the CPU 201 determines that there is no need to cause the image forming apparatus 103 to immediately return from the power saving state 404 (NO to the step S804). Then, the CPU 201 proceeds to a step S805. On the other hand, if the CPU 201 determines in the step S804 that there is need to cause the image forming apparatus 103 to immediately return from the power saving state 404 (YES to the step S804), the CPU 201 proceeds to a step S808.

In the step S805, the CPU 201 sends a notification for inquiring of the user of the PC 101 having sent the job as to whether or not postponed printing of the job can be performed. As a method of this notification, a screen as shown in FIG. 11 is displayed on a display section, not shown, of the PC 101 having sent the job.

Figures 10, 11:
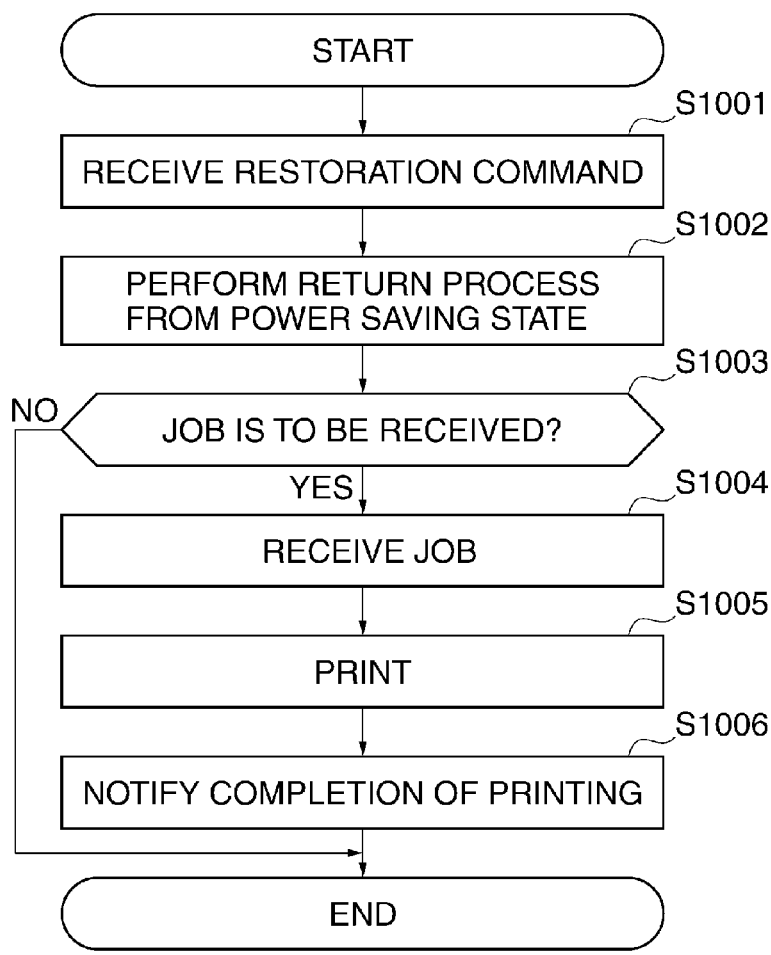
FIG. 10 is a flowchart of a return & print control process executed by the image forming apparatus when the image forming apparatus has returned from the power saving state to a standby state.
FIG. 11 is a view of an example of a notification screen for inquiring as to whether or not postponed printing of the job can be performed.

Referring to FIG. 11, a screen 1101 is used for inquiring of the user as to whether or not the printing of an input job can be postponed since the weekly shutdown is to operate in five minutes, and notifying the user of timing in which the job having the printing thereof postponed is to be printed. Information to be notified on the screen 1101 is changed based on a status of the image forming apparatus 103 before the apparatus shifts to the power saving state 404, which is stored e.g. in the memory 202. For example, in the case of the image forming apparatus 103 being in the status related to the weekly shutdown, the job having the printing thereof postponed is scheduled to be printed next morning after the power of the image forming apparatus 103 is restored.

When the user desires to immediately print the input job instead of performing postponed printing of the job, the user presses a button 1102 on the screen 1101. On the other hand, if the postponed printing for printing the job after restoration of the power of the image forming apparatus 103 may be performed, the user presses a button 1103 on the screen 1101. Further, by checking a checkbox 1104 or not checking the same, it is possible to set whether or not to notify the user of completion of postponed printing of the job when the postponed printing is completed. Examples of a job which the user selects as one capable of being subjected to postponed printing, i.e. for which the user selects to press the button 1103 include jobs low in the degree of emergency of output which are only required to be output in any suitable timing (e.g. required to be printed in time for a next-day conference) e.g. in an office environment.

Examples of notifications which are different according to respective statuses of the image forming apparatus (reasons why it is determined that there is no need to cause the image forming apparatus to immediately return from the power saving state) are as follows.

Automatic Shutdown:
"Power will be turned off in five minutes by automatic shutdown function. Printing can be executed after restoration of power."

Scheduled Printing:
"Scheduled printing is set to be executed in five minutes. Job will be printed after termination of scheduled printing executed in five minutes."

Suspended Job:
"Sheets required for job are not set in a sheet feeder. Job will be printed after sheets are set in the sheet feeder."

Referring again to FIG. 8, the CPU 201 determines whether or not the printing of the received job can be postponed, according to which of the buttons 1102 and 1103 on the screen 1101 is pressed (step S806). If it is determined that the printing of the received job can be postponed (YES to the step S806), the CPU 201 stores the job in a print queue of the memory 202 as a job waiting to print (step S807), followed by terminating the present process. On the other hand, if it is determined in the step S806 that the printing of the received job cannot be postponed (NO to the step S806), the CPU 201 proceeds to the step S808.

In the step S808, the CPU 201 transmits the job to the image forming apparatus 103 via the network interface 205. The job is transmitted to the image forming apparatus 103 from the image processing controller 102, whereby the image forming apparatus 103 is caused to return from the power saving state.

Next, the CPU 201 determines whether or not the job waiting to print, of which the printing is determined to be postponable, is stored in the print queue of the memory 202 (step S809). If it is determined that the job waiting to print is stored in the print queue (YES to the step S809), the CPU 201 transmits the job waiting to print to the image forming apparatus 103 (step S810). On the other hand, if it is determined that no job waiting to print is stored in the print queue (NO to the step S809), the CPU 201 immediately terminates the present process.

Next, in a step S811, the CPU 201 determines whether or not a job completion notification has been received from the image forming apparatus 103 via the network interface 205, to thereby determine whether or not printing of the print job has been completed. The CPU 201 repeats the step S811 until it receives the job completion notification from the image forming apparatus 103. When the job completion notification is received (YES to the step S811), the CPU 201 notifies the user that the job having the printing thereof postponed has been printed (step S812), followed by terminating the present process. An example of a notification screen for notifying the user that the job having the printing thereof postponed has been printed is shown in FIG. 12, by way of example. A date and time when the job was input to the image processing controller 102 and a job name are shown in a notification message, so that it is possible to identify the job from the date and time and the job name. This notification message is sent to the user after elimination of conditions for postponing the printing of the job (the scheduled printing, the weekly shutdown, the automatic shutdown, settings of sheet feeders, etc.), and execution of print processing on the job.

Next, a restoration-time control process, which is executed by the image processing controller 102 when the power of the image forming apparatus 103 has been restored from the power saving state 404 or the power-off state 401, will be described with reference to FIG. 9.

Figure 9:
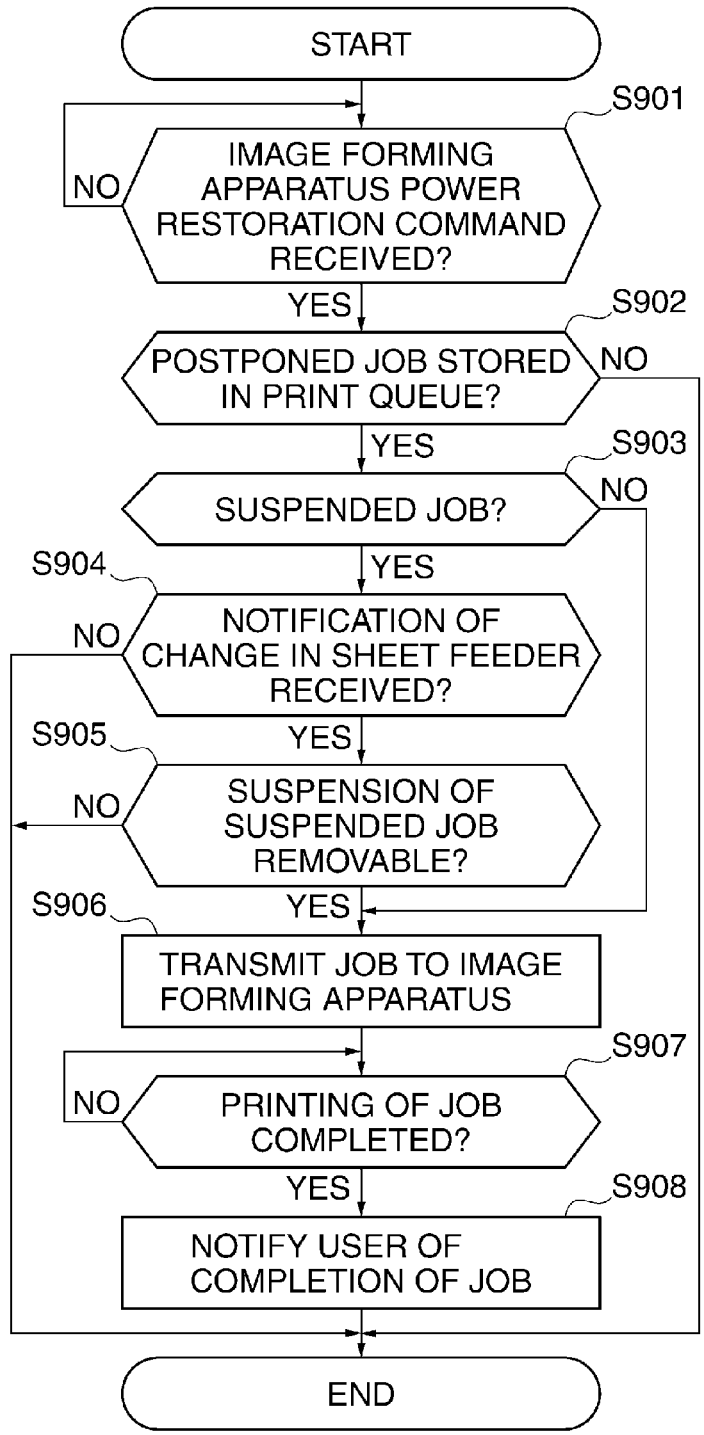
FIG. 9 is a flowchart of a restoration-time control process executed by the image processing controller when power of the image forming apparatus has been restored from the power saving state or a power-off state.

FIG. 9 is a flowchart of the restoration-time control process executed by the image processing controller 102 when the power of the image forming apparatus 103 has been restored from the power saving state 404 or the power-off state 401. Note that the restoration-time control process shown in FIG. 9 is realized by the CPU 201 executing a program loaded into the memory 202.

The CPU 201 determines whether or not a power restoration command has been received from the image forming apparatus 103 via the network interface 205 (step S901). The CPU 201 repeats the step S901 until it receives the power restoration command from the image forming apparatus 103. If it is determined that the power restoration command has been received from the image forming apparatus 103 (YES to the step S901), the CPU 201 determines whether or not the job having the printing thereof postponed is stored in the print queue of the memory 202 as a job waiting to print (step S902). If it is determined that the job having the printing thereof postponed is stored in the print queue (YES to the step S902), the CPU 201 proceeds to a step S903. On the other hand, if it is determined that the job having the printing thereof postponed is not stored in the print queue (NO to the step S902), the CPU 201 immediately terminates the present process.

In the step S903, the CPU 201 determines whether or not the job having the printing thereof postponed is stored as a suspended job due to mismatch in sheet type between a sheet feeder to be used for the job and sheets to be used for the job. If it is determined that the job is stored in the memory 202 as a suspended job (YES to the step S903), the CPU 201 proceeds to a step S904, whereas if it is determined that the job is not stored in the memory 202 as a suspended job (NO to the step S903), the CPU 201 proceeds to a step S906.

In the step S904, the CPU 201 determines whether or not a notification of a change in the setting of the sheet feeder has been received from the image forming apparatus 103. If it is determined that the notification of the change in the sheet feeder has been received (YES to the step S904), the CPU 201 proceeds to a step S905. On the other hand, if it is determined that the notification of the change in the sheet feeder has not been received (NO to the step S904), the CPU 201 terminates the present process.

In the step S905, the CPU 201 determines based on the received notification of the change in the sheet feeder whether or not sheets required for printing the job are set in the sheet feeder to be used for printing, whereby the suspended job has become printable. If it is determined that the required sheets are set and the suspension of the suspended job can be removed (YES to the step S905), the CPU 201 proceeds to the step S906. On the other hand, if it is determined that the required sheets are not set and the suspended state of the job cannot be removed even after the change in the sheet feeder (NO to the step S905), the CPU 201 immediately terminates the present process.

In the step S906, the CPU 201 transmits the job to the image forming apparatus 103 via the network interface 205. Next, the CPU 201 determines whether or not a print completion notification of the job has been received from the image forming apparatus 103 (step S907). The CPU 201 repeats the step S907 until it receives the print completion notification of the job. If it is determined that the notification of completion of printing the job has been received from the image forming apparatus 103 (YES to the step S907), the CPU 201 proceeds to a step S908.

In the step S908, the CPU 201 notifies the PC 101 having sent the job via the network interface 204 that printing of the job having the printing thereof postponed by the user has been completed.

As described above, jobs set to postponed printing which is to be executed after restoration of the power of the image forming apparatus 103 can be collectively printed when the power of the image forming apparatus 103 is restored for some reason. Further, it is possible to prevent the image forming apparatus 103 from returning from the power saving state until the suspended state of a job is removed which is suspended due to mismatch in sheet type between a sheet feeder to be used for the job and sheets to be used for the job. This makes it possible to prevent the image forming apparatus 103 from being caused to return from the power saving state before clearing a paper-out state thereof and being placed in an unusable state, whereby it is possible to prevent wasteful power consumption.

Next, a description will be given of a return & print control process, which is executed by the image forming apparatus 103 when the image forming apparatus 103 has returned from the power saving state 404 to the standby state 402, with reference to FIG. 10.

FIG. 10 is a flowchart of the return & print control process executed by the image forming apparatus 103 when the image forming apparatus 103 has returned from the power saving state 404 to the standby state 402. Note that the return & print control process shown in FIG. 10 is realized by the CPU 208 executing a program loaded into the memory 209.

The CPU 208 receives a return command from the console section 105 or from the image processing controller 102 via the network interface 210 (step S1001). Next, the CPU 208 performs processing required for the image forming apparatus to return from the power saving state 404 (step S1002).

Then, the CPU 208 determines whether or not a job is to be received from the image processing controller 102 (step S1003). If the CPU 208 determines that a job is to be received from the image processing controller 102 (YES to the step S1003), the CPU 208 proceeds to a step 1004, whereas if the CPU 208 determines that no job is to be received from the image processing controller 102 (NO to the step S1003), the CPU 208 immediately terminates the present process.

In the step S1004, the CPU 208 receives the job via the network interface 205. Then, the CPU 208 causes the printer section 107 to perform print processing (step S1005).

Next, the CPU 208 notifies the image processing controller 102 of completion of the print processing (step S1006), followed by terminating the present process.

As described above, it is possible to receive the job having the printing thereof postponed, from the image processing controller 102 and print the job, without performing special processing on the image forming apparatus 103, including operation by the user.

According to the above-described embodiment, when the image forming apparatus 103 receives a job in the power saving state 404, the image processing controller 102 determines whether or not to cause the image forming apparatus 103 to return from the power saving state 404, based on the status of the image forming apparatus 103 before the apparatus shifts to the power saving state 404. If it is determined that there is no need to cause the image forming apparatus 103 to return from the power saving state 404, the image processing controller 102 stores the received job as a job waiting to print, and when the image forming apparatus 103 returns from the power saving state 404, transmits the stored job waiting to print to the image forming apparatus 103. This makes it possible to prevent the image forming apparatus 103 from being caused to inefficiently return from the power saving state 404 and wastefully consuming electric power. Further, it is possible to prevent the hard disk from being worn by frequent return from the power saving state to the standby state.

Next, a second embodiment of the present invention will be described. The second embodiment has the same configurations as those of the above-described first embodiment shown in FIGS. 1 to 5. Therefore, the same components and elements as those of the first embodiment are denoted by the same reference numerals, and description thereof is omitted. In the following, a description will be given only of different points from the first embodiment.

In the above-described first embodiment, when it is determined that there is no need to cause the image forming apparatus 103 to return from the power saving state 404, the image processing controller 102 inquires of the PC 101 having sent the received job as to whether the job can be subjected to postponed printing. In the second embodiment, whether or not to perform postponed printing is determined by referring to information indicative of a setting of a job received by the image processing controller 102 concerning whether or not the job can be subjected to postponed printing.

Figure 16:
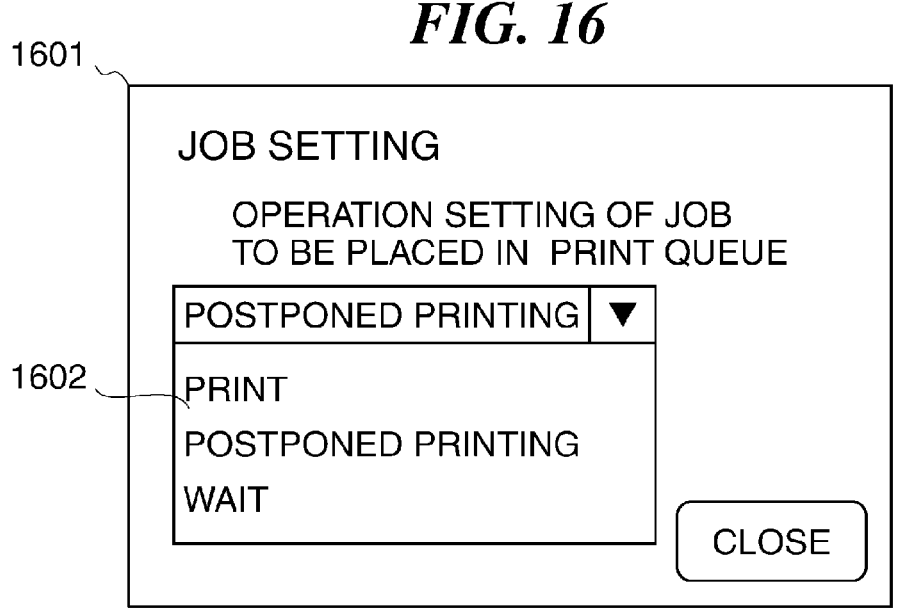
FIG. 16 is a view of an example of a job configuration screen displayed by an image processing controller according to a second embodiment of the present invention, for prompting a user to make a setting to a job as to whether the job can be subjected to postponed printing.

FIG. 16 is a view of an example of a job configuration screen displayed by an image processing controller according to the second embodiment, for prompting a user to make a setting to a job as to whether the job can be subjected to postponed printing. Although the job configuration screen is assumed to be displayed during configuration of the job by a printer driver (not shown) or during configuration of the job by a job management application (not shown), this is not limitative. For example, the image processing controller 102 may be configured to have an ASP (Application Service Provider) function such that a job configuration screen is displayed on the PC 101 by the ASP function.

On the job configuration screen 1601, a dropdown list 1602 is displayed, and "print", "postponed print", or "wait" can be selected for an operation setting of a job to be placed in a print queue. When "print" is selected, the job is immediately placed in the print queue to start printing of the job. When "postponed print" is selected, if the image forming apparatus 103 is in the power saving state 404, the job is stored in the print queue, but input of the job to the image forming apparatus 103 is postponed. When the image forming apparatus 103 returns from the power saving state 404, the job is input to the image forming apparatus 103, and is printed without the user giving a print instruction again. Note that in a case where the user selects "postponed print", if the image forming apparatus 103 is not in the power saving state 404, the job is immediately input to the image forming apparatus 103 similarly to a normal print instruction. When "wait" is selected, the job is stored in a waiting queue. When the user desires to resume printing of the job, it is necessary to give a print instruction by designating the job.

Next, a description will be given of an operation process executed by the image processing controller 102 when the image processing controller 102 receives the job to which a setting has been made on the job configuration screen 1601.

Figure 17:
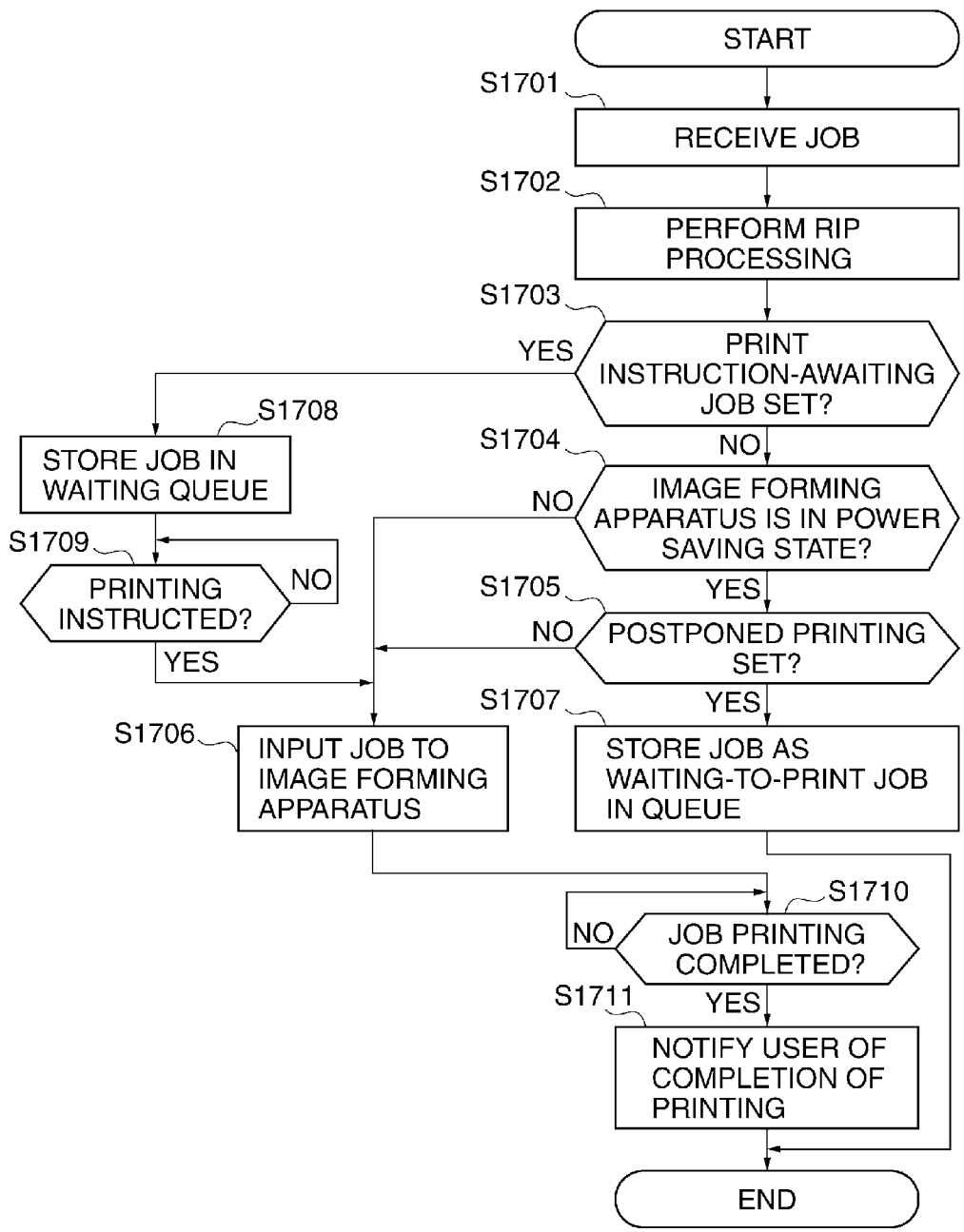
FIG. 17 is a flowchart of a job reception-time control process executed by the image processing controller according to the second embodiment when a job is received to which a setting has been made on the job configuration screen.

FIG. 17 is a flowchart of a job reception-time control process executed by the image processing controller 102 when the image processing controller 102 receives the job to which a setting has been made on the job configuration screen 1601. Note that the job reception-time control process shown in FIG. 17 is realized by the CPU 201 executing a program loaded into the memory 202.

The CPU 201 receives a job transmitted e.g. from the PC 101 via the network interface 204 (step S1701). Next, the CPU 201 performs the RIP processing on the received job (step S1702), and determines whether or not "wait" is set in the received job (step S1703). When "wait" is included in the print settings of the received job, the CPU 201 determines that the job has a print instruction-awaiting job setting (YES to the step S1703), and proceeds to a step S1708. On the other hand, when "wait" is not included in the print settings of the received job, the CPU 201 determines that the job does not have a print instruction-awaiting job setting (NO to the step S1703), and proceeds to a step S1704.

In the step S1704, the CPU 201 determines whether or not the image forming apparatus 103 is in the power saving state 404. If it is determined that the image forming apparatus 103 is in the power saving state 404 (YES to the step S1704), the CPU 201 proceeds to a step S1705. On the other hand, if it is determined that the image forming apparatus 103 is in a state other than the power saving state 404 (NO to the step S1704), the CPU 201 proceeds to a step S1706.

In the step S1705, the CPU 201 determines whether or not postponed printing is set in the received job (step S1705). If the "postponed printing" is included in the print settings of the received job, the CPU 201 determines that the job has a postponed print setting (YES to the step S1705), and proceeds to a step S1707. On the other hand, if the "postponed printing" is not included in the print settings of the received job, the CPU 201 determines that the job does not have a postponed print setting (NO to the step S1705), and proceeds to the step S1706. Note that as is apparent from the step S1704, depending on the status of the image forming apparatus 103, if the image forming apparatus 103 is not in the power saving state 404, the received job is processed similarly to a normal job even when the postponed printing is included in the print settings of the job.

In the step S1706, the CPU 201 inputs the job to the image forming apparatus 103 via the network interface 205. By inputting the job to the image forming apparatus 103, the image forming apparatus 103, if in the power saving state 404, returns from the power saving state 404.

Next, the CPU 201 determines whether or not the job completion notification has been received from the image forming apparatus 103 (step S1710). The CPU 201 repeats the step S1710 until it receives the print completion notification of the job. When the CPU 201 determines that it has received the print completion notification (YES to the step S1710), the CPU 201 notifies the user that printing of the job subjected to the postponed printing has been completed, via the network interface 204 (step S1711), followed by terminating the present process.

In the step S1708, the CPU 201 stores the job instructed to be stored in the waiting queue, in the waiting queue of the memory 202. Then, the CPU 201 determines whether or not a print instruction for printing the job stored in the waiting queue has been given by a user operation (step S1709). The CPU 201 repeats the step S1709 until it receives the print instruction. When it is determined that the print instruction has been given (YES to the step S1709), the CPU 201 proceeds to the step S1706.

On the other hand, in the step S1707, the CPU 201 stores the job having the postponed print setting, in the print queue of the memory 202, as a job waiting to print, followed by terminating the present process.

According to the above-described second embodiment, it is possible to set postponed printing in advance in a job when printing of the is set, which prevents the image forming apparatus 103 in the power saving state 404 from being caused to return from the power saving state 404 by a job which is not urgent and has been set to postponed printing. This makes it possible to prevent the image forming apparatus 103 from being caused to return from the power saving state 404 unnecessarily and inefficiently, whereby it is possible to reduce power consumption.

It is to be understood that the advantageous effects can also be obtained when the above-described second embodiment is applied to the above-described first embodiment.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-131615 filed Jun. 24, 2013 which is hereby incorporated by reference herein in its entirety.

What is claimed is:

1. An image processing controller that performs image processing in cooperation with an image forming apparatus capable of shifting to a power saving state, comprising:
   an acquisition unit configured to acquire a status of the image forming apparatus;
   a determination unit configured to determine, in a case where the image processing controller receives a job from an external apparatus when the image forming apparatus is in the power saving state, whether or not to cause the image forming apparatus to return from the power saving state, based on the status of the image forming apparatus acquired by said acquisition unit;
   a storage unit configured to store the job in a case where it is determined by said determination unit that there is no need to cause the image forming apparatus to return from the power saving state; and
   a transmission unit configured to transmit raster image data generated based on the job stored in said storage unit to the image forming apparatus, when the image forming apparatus has returned from the power saving state,
   wherein said transmission unit is configured to transmit raster image data generated based on the received job to the image forming apparatus, in a case where it is determined by said determination unit that there is need to cause the image forming apparatus to return from the power saving state.

2. The image processing controller according to claim 1, further comprising a notification unit configured to notify, when it is determined by said determination unit that there is no need to cause the image forming apparatus to return from the power saving state, a sender of the job of an inquiry as to whether or not printing of the job can be postponed.

3. The image processing controller according to claim 2, wherein said notification unit notifies the sender of the job of a reason why it is determined that there is no need to cause the image forming apparatus to return from the power saving state, and a schedule for resuming printing of the job.

4. The image processing controller according to claim 1, further comprising:
   a print completion determination unit configured to determine whether or not printing of the job transmitted from said transmission unit has been completed, and
   a job completion notification unit configured to, when it is determined by said print completion determination unit that printing of the has been completed, notify a sender of the job of completion of printing of the job.

5. The image processing controller according to claim 1, further comprising:
   a job setting unit configured to make a setting of the print job as to whether or not postponed printing of the can be performed when the image forming apparatus is in the power saving state; and
   a postponed printing determination unit configured to determine whether or not the received job has been set to postponed printing, based on information set by said job setting unit,
   wherein said storage unit stores the job determined by said postponed printing determination unit to have been set to postponed printing, as a job waiting to print.

6. The image processing controller according to claim 1, wherein statuses of the image forming apparatus to be acquired by said acquisition unit include settings of weekly shutdown, automatic shutdown, a suspended state, and scheduled printing, and
   wherein when any of the settings of the weekly shutdown, the automatic shutdown, the suspended state, and the scheduled printing has been made, said determination unit determines that there is no need to cause the image forming apparatus to immediately return from the power saving state.

7. The image processing controller according to claim 1, wherein statues of the image forming apparatus to be acquired by said acquisition unit include error information, and
   wherein it is determined based on the error information acquired by said acquisition unit that an error has occurred in the image forming apparatus, said determination determines that there is no need to cause the image forming apparatus to immediately return from the power saving state.

8. An image forming system including an image forming apparatus capable of shifting to a power saving state, and an image processing controller that performs image processing in cooperation with the image forming apparatus,
   the image forming apparatus comprising:
   a notifying unit configured to notify a status of the image forming apparatus,
   the image processing controller comprising:
   an acquisition unit configured to acquire the status of the image forming apparatus notified by said notifying unit;
   a determination unit configured to determine, in a case where the image processing controller receives a job from an external apparatus when the image forming apparatus is in the power saving state, whether or not to cause the image forming apparatus to return from the power saving state, based on the status of the image forming apparatus acquired by said acquisition unit;
   a storage unit configured to store the job in a case where it is determined by said determination unit that there is no need to cause the image forming apparatus to return from the power saving state; and
   a transmission unit configured to transmit raster image data generated based on the job stored in said storage unit to the image forming apparatus, when the image forming apparatus has returned from the power saving state,
   wherein said transmission unit is configured to transmit raster image data generated based on the received job to the image forming apparatus, in a case where it is determined by said determination unit that there is need to cause the image forming apparatus to return from the power saving state.

9. A method of controlling an image forming system including an image forming apparatus capable of shifting to a power saving state, and an image processing controller that performs image processing in cooperation with the image forming apparatus,
   wherein the method comprises causing the image processing controller to:
   acquire a status of the image forming apparatus;
   determine, in a case where the processing controller receives a job from an external apparatus when the image forming apparatus is in the power saving state, whether or not to cause the image forming apparatus to return from the power saving state, based on the status of the image forming apparatus;

store the job in a case where it is determined that there is no need to cause the image forming apparatus to return from the power saving state;

transmit raster image data generated based on the stored job stored, when the image forming apparatus has returned from the power saving state; and transmit raster image data generated based on the received job, in a case where it is determined that there is need to cause the image forming apparatus to return from the power saving state.

10. A non-transitory computer-readable storage medium storing a computer-executable program for causing a computer to execute a method of controlling an image forming system including an image forming apparatus capable of shifting to a power saving state and an image processing controller that performs image processing in cooperation with the image forming apparatus, wherein the method comprises causing the image processing controller to:

acquire a status of the image forming apparatus;

determine, in a case where the image processing controller receives a job from an external apparatus when the image forming apparatus is in the power saving state, whether or not to cause the image forming apparatus to return from the power saving state, based on the status of the image forming apparatus;

store the job in a case where it is determined that there is no need to cause the image forming apparatus to return from the power saving state;

transmit raster image data generated based on the stored job, when the image forming apparatus has returned from the power saving state; and transmit raster image data generated based on the received job, in a case where it is determined that there is need to cause the image forming apparatus to return from the power saving state.

* * * * *